United States Patent [19]

Oishi

[11] Patent Number: 4,901,180
[45] Date of Patent: Feb. 13, 1990

[54] MAGNETIC DISK CARTRIDGE
[75] Inventor: Kengo Oishi, Kanagawa, Japan
[73] Assignee: Fuji Photo Film Co., Ltd., Kanagawa, Japan
[21] Appl. No.: 333,722
[22] Filed: Mar. 27, 1989

Related U.S. Application Data

[63] Continuation of Ser. No. 94,558, Sep. 9, 1987, abandoned.

[30] Foreign Application Priority Data

Sep. 9, 1986 [JP] Japan .................. 61-138375

[51] Int. Cl.⁴ .............................................. G11B 23/02
[52] U.S. Cl. ............................................................ 360/133
[58] Field of Search .................................. 360/133, 132

[56] References Cited

U.S. PATENT DOCUMENTS 3,668,658  6/1972  Flores et al. ................... 360/133 X
3,725,520  4/1973  Suzuki et al. ............ 264/DIG. 62 X
4,357,249  11/1982  Mellor .................................. 252/12
4,391,952  7/1983  Lybrand ......................... 524/910 X
4,458,858  7/1984  Nelson ............................... 360/132
4,518,552  5/1985  Matsuo et al. ...................... 264/126

FOREIGN PATENT DOCUMENTS 0075301   3/1983  European Pat. Off. ............ 206/313
60-179974 9/1985  Japan ................................ 360/133

Primary Examiner—John H. Wolff
Attorney, Agent, or Firm—Sughrue, Mion, Zinn, Macpeak & Seas

[57] ABSTRACT

A magnetic disk cartridge comprises a disk case and a magnetic disk rotatably disposed in the disk case. A liner member formed of a porous super-high molecular polyethylene is disposed at least between an inner surface of the disk case and a circular surface of the magnetic disk.

5 Claims, 3 Drawing Sheets

MAGNETIC DISK CARTRIDGE

This is a Continuation of application Ser. No. 07/094,558, filed 9/9/87 now abandoned.

BACKGROUND OF THE INVENTION

1. Field of the Invention

This invention relates to a magnetic disk cartridge comprising a disk case, and a magnetic disk rotatably supported by liner members in the disk case.

2. Description of the Prior Art

In general, magnetic disk cartridges are constituted by securing a pair of disk-like liner members formed of a nonwoven fabric respectively to inner surfaces of upper and lower case halves of a disk case, and supporting a magnetic disk rotatably with respect to the disk case by the liner members. The liner members rotatably support the magnetic disk and clean the magnetic disk while the magnetic disk is being rotated. Dust debris and the like which cling to the surface of the magnetic disk are caught among fibers of the nonwoven fabric.

In the aforesaid conventional magnetic disk cartridge, the nonwoven fabric used as the liner members has the effect of collecting dust, debris or the like present on the surfaces of the magnetic disk. However, part of the fibers constituting the nonwoven fabric separate from the nonwoven fabric, for example, when the magnetic disk cartridge receives an impact, and cling as dust to the surface of the magnetic disk. Thus the nonwoven fabric itself constitutes a source of dust clinging to the magnetic disk. Also, the nonwoven fabric is mainly formed of a material such as rayon, polyester or polypropylene which has a comparatively large coefficient of friction $\mu$. Therefore, the frictional resistance is high and it is not always possible to increase the rotation speed of the magnetic disk for the purpose of, for example, improving the data transfer rate. The conventional magnetic disk cartridge also has the drawback that, since the nonwoven fabric and the magnetic disk exhibit a high electrical resistance, the magnetic disk is electrostatically charged and dust, debris or the like readily cling thereto when the magnetic disk is rotated.

SUMMARY OF THE INVENTION

The primary object of the present invention is to provide a magnetic disk cartridge free from generation of dust from a liner member or liner members rotatably supporting a magnetic disk.

Another object of the present invention is to provide a magnetic disk cartridge which enables the cleanliness of the surface of a magnetic disk during the use of the magnetic disk to be improved.

The present invention provides a magnetic disk cartridge comprising a disk case and a magnetic disk rotatably disposed in said disk case, wherein a liner member formed of a porous super-high molecular polyethylene is disposed at least between an inner surface of said disk case and a circular surface of said magnetic disk.

By the term "porous super-high molecular polyethylene" as used herein is meant a material obtained by sintering grains of a super-high molecular weight polyethylene having a molecular weight of at least 2,000,000 into a porous condition by the adjustment of grain size and sintering pressure in the course of sintering. The pore diameter should preferably be adjusted to a value within the range of approximately 30$\mu$m to 200$\mu$m, and the pores should preferably contain a lubricant for decreasing the frictional resistance with respect to the magnetic disk and/or an antistatic agent for prevention of electrostatic charging of the magnetic disk.

With the magnetic disk cartridge in accordance with the present invention wherein the liner member is formed of the porous super-high molecular polyethylene, pores of the porous super-high molecular polyethylene can collect dust, debris or the like clinging to the surface of the magnetic disk, thereby to clean the surface of the magnetic disk. Also, since the liner member is formed by the sintering of the grains of the porous super-high molecular polyethylene, no dust is generated from the liner member even if the magnetic disk cartridge receives an impact, and it is possible to improve the cleanliness of the surface of the magnetic disk during the use of the magnetic disk. In the case where a lubricant is contained in the pores of the porous super-high molecular polyethylene, the frictional resistance of the liner member with respect to the magnetic disk can be lowered by the lubricant, and therefore the rotation speed of the magnetic disk can be increased. In the case where an antistatic agent is contained in the pores of the porous super-high molecular polyethylene, electrostatic charging of the magnetic disk can be prevented, and the clinging of dust, debris or the like to the magnetic disk can be minimized.

In the magnetic disk cartridge of the present invention, two liner members may be disposed with the magnetic disk intervening therebetween.

DESCRIPTION OF THE PREFERRED EMBODIMENTS

The present invention will hereinbelow be described in further detail with reference to the accompanying drawings.

Figure 1:
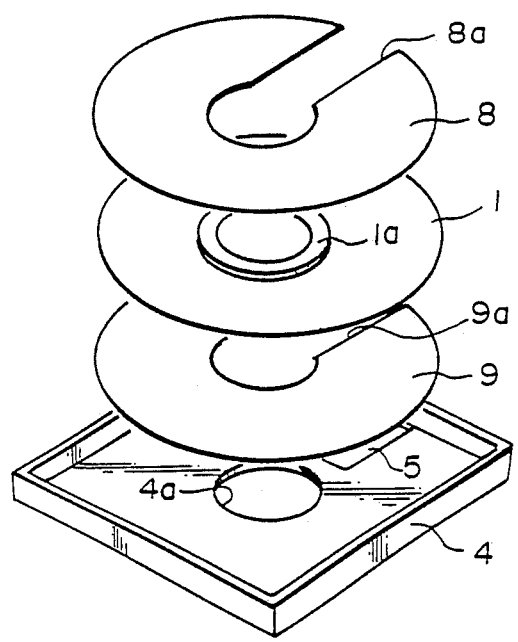
FIG. 1 is a perspective exploded view showing an embodiment of the magnetic disk cartridge in accordance with the present invention with the upper case half omitted.
Figure 2:
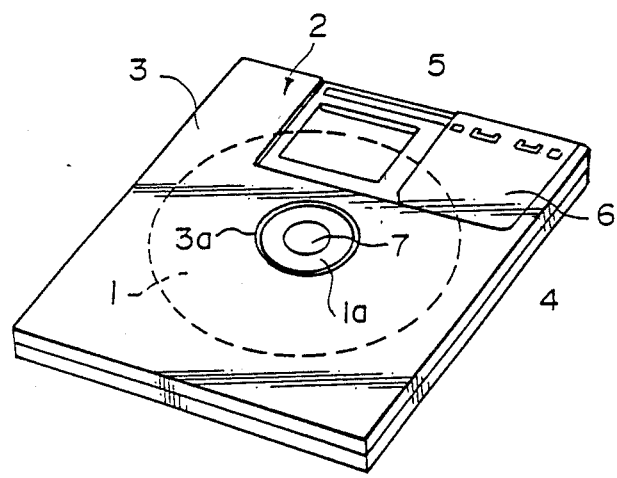
FIG. 2 is a perspective view showing the assembled form of the embodiment shown in FIG. 1.

Referring to FIGS. 1 and 2, a magnetic disk sheet 1 is rotatably housed in a case 2 composed of an upper case half 3 and a lower case half 4, and a center boss 1a at the center of the magnetic disk sheet 1 is projected outward from an opening 3a of the upper case half 3 and an opening 4a of the lower case half 4. The upper case half 3 and the lower case half 4 are provided with openings 5, 5 from which the magnetic disk sheet 1 is to be exposed to the outside of the case 2 and into which a magnetic head (not shown) is to be inserted in the course of use of the magnetic disk cartridge. The openings 5, 5 into which the magnetic head is to be inserted are formed at positions facing each other, and are opened and closed by a shutter 6 that can slide on the case 2. Also, liner members 8 and 9 are disposed in the case 2 so that the magnetic disk sheet 1 disposed in the upper case half 3 and the lower case half 4 intervenes between the liner members 8 and 9. The liner members 8 and 9 are respectively provided with cutaway portions 8a and 9a corresponding to the openings 5, 5 into which the magnetic head is to be inserted, and are secured to the inner surface of the upper case half 3 and the lower case half 4. When the magnetic disk cartridge is set in an apparatus such as a camera, a magnetic head enters an opening 5 provided for insertion of the magnetic head, and contacts the magnetic disk sheet 1. Also, a spindle member of the apparatus enters a center opening formed at the center of the center boss 1a and is engaged with the center boss 1a to rotate it. When the center boss 1a is rotated, the magnetic disk sheet 1 secured thereto also rotates. In this manner, information is recorded on the magnetic disk sheet 1 or is reproduced therefrom by means of the magnetic head.

Figure 3:
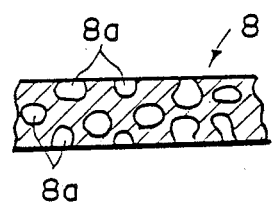
FIG. 3 is a sectional view showing the liner member used in the embodiment shown in FIG. 1.

In the aforesaid embodiment, the liner members 8 and 9 for rotatably supporting the magnetic disk sheet 1 from both sides thereof are formed of a porous super-high molecular polyethylene. The liner members 8 and 9 formed of the porous super-high molecular polyethylene are made by sintering fine grains of a super-high molecular polyethylene having a molecular weight of at least 2,000,000 into a porous condition by the adjustment of the grain size and the sintering pressure. The grain size and the sintering pressure should preferably be adjusted so that the pore diameters are within the range of 30$\mu$m to 200$\mu$m. In order to make the liner members 8 and 9 for the aforesaid embodiment from the porous super-high molecular polyethylene obtained in this manner, the porous super-high molecular polyethylene is cut to the thicknesses of the liner members 8 and 9. As a result, as shown in FIG. 3, the liner member 8 for example has many pores 8a, 8a, . . . , and some of the pores 8a, 8a, . . . are exposed outward when the liner member is cut as mentioned above. Therefore, when the magnetic disk sheet 1 is rotatably supported between the liner members 8 and 9, dust, debris or the like on the surface of the magnetic disk sheet 1 enters the exposed pores 8a, 8a, . . . and pores 9a, 9a, . . . of the liner members 8 and 9 in the course of rotation of the magnetic disk sheet 1, and the surface of the magnetic disk sheet 1 is cleaned in this manner. As shown in FIG. 3, in the liner members 8 and 9 formed of the porous super-high molecular polyethylene, the grains of the super-high molecular polyethylene are fused together by sintering. Accordingly, the liner members 8 and 9 are free from the problem that dust is generated by the liners as in the case of nonwoven fabric liners employed in the conventional magnetic disk cartridge.

In the case where the magnetic disk cartridge in accordance with the present invention using the liner members 8 and 9 is used, the coefficient of friction ($\mu$) of the liner members 8 and 9 with respect to the magnetic disk sheet 1 should preferably be lowered to facilitate rotation of the magnetic disk sheet 1 at a high speed. For this purpose, a lubricant should preferably be contained in the surface pores 8a, 8a, . . . and the surface pores 9a, 9a, . . . of the liner members 8 and 9.

As the lubricant, it is possible to use silicone oil, graphite, molybdenum disulfide, boron nitride, graphite fluoride, fluorine alcohol, polyolefin (polyethylene wax or the like), polyglycol (polyethylene oxide wax or the like), alkyl phosphoric ester, polyphenyl ether, tungsten disulfide, an aliphatic acid ester of a monobasic aliphatic acid having 10 to 20 carbon atoms with at least one of a monohydric alcohol, a dihydric alcohol, a trihydric alcohol, a tetrahydric alcohol and a hexahydric alcohol having 3 to 12 carbon atoms, an aliphatic acid ester of a monobasic aliphatic acid having at least 10 carbon atoms with such a monohydric, dihydric, trihydric, tetrahydric, pentahydric or hexahydric alcohol that the sum of the number of the carbon atoms of the aliphatic acid and the number of the carbon atoms of the alcohol is within the range of 11 to 28, or the like. An aliphatic acid, an aliphatic acid amide or an aliphatic alcohol having 8 to 22 carbon atoms may also be used for this purpose. Such an organic compound lubricant may, for example, be butyl caprylate, octyl caprylate, ethyl laurate, butyl laurate, octyl laurate, ethyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, oleyl alcohol, or lauryl alcohol. Also, as the lubricant, a lubricating oil additive such as an anti-oxidant (alkyl phenol or the like), a rust preventive (naphthenic acid, alkenyl succinate, dilauryl phosphate or the like), an oiliness improver (colza oil, lauryl alcohol or the like), an extreme pressure additive (dibenzyl sulfide, tricresyl phosphate, tributyl phosphite or the like), a detergentdispersant, a viscosity index improver, a pour point depressant, or a foaming preventive may be used alone. The lubricant is added in a ratio within the range of 0.05 to 20 parts by weight per 100 parts by weight of a binder. The lubricants are described in Japanese Patent Application Nos. 42(1967)-28647 and 43(1968)-81543, Japanese Patent Publication Nos. 43(1968)-23889 and 47(1972)-28043, U.S. Pat. Nos. 3,423,233, 3,470,021, 3,492,235, 3,497,411, 3,523,086, 3,625,760, 3,630,772, 3,634,253, 3,642,539, and 3,687,725, "IBM Technical Disclosure Bulletin", Vol. 9, No. 7, p. 779 (December 1966); "ELEKTRONIK", 1961, No. 12, p. 380; and "Kagaku Benran" (Chemical Handbook), application edition, pp. 954–967, 1980, Maruzen.

Also, in order to prevent electrostatic charging of the magnetic disk sheet 1 in the course of its rotation, an antistatic agent such as powder of graphite, carbon black, or carbon black graft polymers may be added to the material of the liner members 8 and 9 at the time of sintering, or may be contained in the pores 8a, 8a, . . . and the pores 9a, 9a, . . . of the liner members 8 and 9. The antistatic agent, may, for example, be a natural surface active agent such as saponin; a nonionic surface active agent such as an alkyleneoxide compound, a glycerin compound, a glycidol compound, a polyhydric alcohol, a polyhydric alcohol ester, or an adduct of an alkyl phenol with ethylene oxide; a cationic surface active agent such as a higher alkylamine, a cyclic amine, a hydantoin derivative, an amidoamine, an ester amide, a quaternary ammonium salt, a heterocyclic compound, e.g. pyridine, a phosphonium compound or a sulfonium compound; an anionic surface active agent containing acidic groups such as carboxylic acid, sulfonic acid, phosphoric acid, sulfuric acid ester, and phosphoric acid ester groups; or an amphoteric surface active agent such as an amino acid, an amino sulfonic acid, a sulfate or a phosphate of an amino alcohol, or an alkyl betaine compound. Examples of the surface active agents which may be used as the antistatic agent in the present invention are described in, for example, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974; West German Offenlegungsschrift No. 1,942,665; British Patent Nos. 1,077,317 and 1,198,450; "Synthesis and Applications of Surface Active Agents" by Ryohei Oda, et al., Tsubaki Shoten, 1972; "Surface Active Agents" by A. W. Perry, Interscience Publication Incorporated, 1958; "Encyclopedia of Surface Active Agents, Vol. 2" by T. P. Sisley, Chemical Publish Company, 1964; "Surface Active Agent Handbook", sixth edition, Sangyo Tosho K.K., Dec. 20, 1966; and "Antistatic Agents" by Hideo Marushige, Saiwai Shobo, 1968.

The surface active agents may be used alone or as a mixture of two or more thereof. The surface active agents may also be used for purposes other than as the antistatic agents, for example, for dispersion, improvement of magnetic characteristics and lubricating properties, and as coating assisting auxiliaries.

I claim:

1. A magnetic disk cartridge, comprising:
   a disk case,
   a magnetic disk rotatably disposed in said disk case; and
   a liner member disposed at least between an inner surface of said disk case and a circular surface of said magnetic disk, wherein said liner member is a porous super-high molecular weight polyethylene.

2. A magnetic disk cartridge as defined in claim 1 wherein pore diameters of said porous super-high molecular polyethylene are within the range of approximately 30μm to approximately 200μm.

3. A magnetic disk cartridge as defined in claim 1 wherein a lubricant is contained in pores of said porous super-high molecular polyethylene.

4. A magnetic disk cartridge as defined in claim 1 wherein an antistatic agent is contained in pores of said porous super-high molecular polyethylene.

5. A magnetic disk cartridge as defined in claim 1, wherein the grains of said porous super-high molecular weight polyethylene are fused together by sentering.

* * * * *